July 2, 1940.  A. NOVICK  2,206,044
ENVELOPE CONSTRUCTION
Filed May 12, 1938
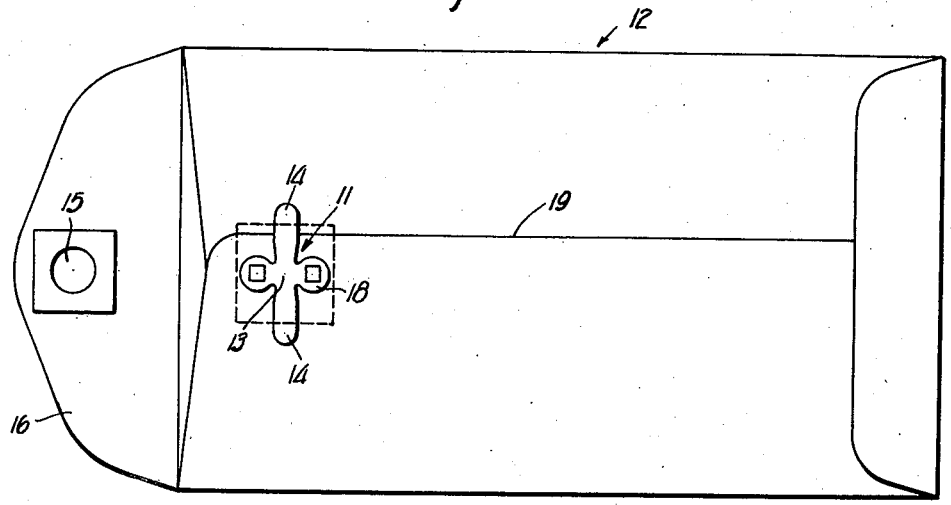
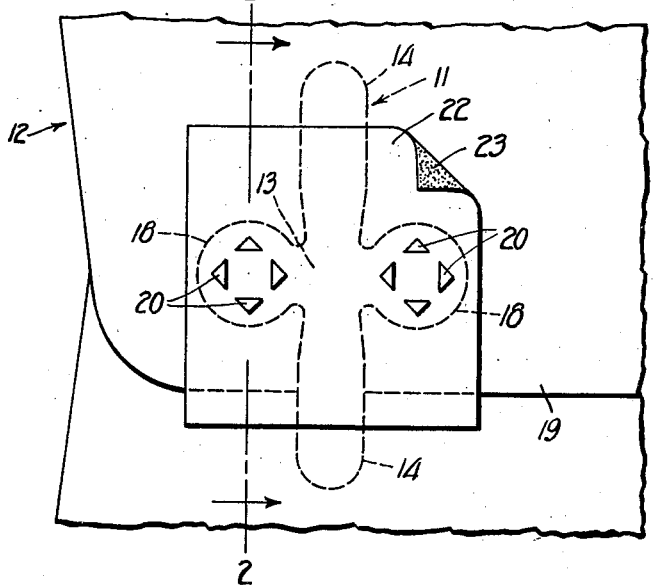
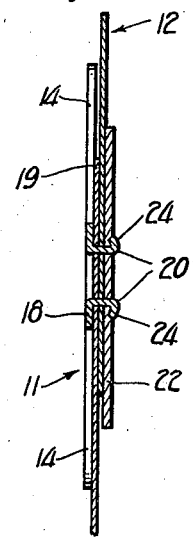
INVENTOR.
Abraham Novick
BY Moses & Nolte
ATTORNEYS Patented July 2, 1940

2,206,044

UNITED STATES PATENT OFFICE 2,206,044

ENVELOPE CONSTRUCTION

Abraham Novick, Flushing, N. Y., assignor to F. L. Smithe Machine Co., Inc., New York, N. Y., a corporation of New York Application May 12, 1938, Serial No. 207,436

2 Claims. (Cl. 229—78)

This invention relates to sheet metal fasteners for envelopes of the type having bendable fastener tongues adapted to be inserted through a hole in the envelope flap and bent down to hold the flap in place.

It is an object of the invention to provide a fastener of this type having a plurality of fastening tongues and a body comprising a portion extending transversely of the tongues and provided with attaching prongs at each side of the line of the tongues so as to attach the body firmly to the envelope wall in such way that it cannot be lifted or rocked so as to become detached from the envelope.

Another object of the invention is to provide a fastener construction in which the prongs are bent back tightly against or embedded into the paper to which the fastener is attached so as to provide a smooth finish inside the envelope thereby preventing the corners or points of the prongs from catching on or injuring the contents of the envelope.

A further object of the invention is to provide an envelope construction in which the fastener prongs transfix and engage a plurality of plies of paper including the envelope wall and a reinforcing patch adhered to the inner face of the envelope wall. The envelope wall may be of one or more thicknesses which may be provided for instance by the overlapping edges of the flaps forming the back of the envelope, the fastener prongs passing through the flaps which may or may not be reinforced by a patch.

Further objects of the invention will appear from the following description of a preferred embodiment.

In the drawing forming a part of this specification:

Fig. 1 is a view in rear elevation of an envelope with a fastener of my invention applied thereto;

Fig. 2 is a view of the inner wall of an envelope, showing the manner of applying the fastener through the reenforcing patch; and Fig. 3 is a section taken on the line 2—2 of Fig. 2.

The fastener of this invention, shown generally at 11, Fig. 1, may be made of sheet metal and is preferably applied to the wall of the envelope 12 at a point where the portions of the wall of the envelope overlap forming a seam 19 so that the engagement of the fastener is through a double wall rather than a single wall, thus adding strength to the unit, though this provision is not intended as a limitation since the fastener is useful when applied to a single wall.

The fastening device comprises a body portion 13 having tongues 14 extending therefrom. Said tongues are adapted to be bent into position perpendicular to the body portion and thrust through a suitable orifice 15 in the flap 16 of the envelope.

Extending from the body portion 13 at an angle to tongues 14 are lobes 18 which are punched to provide attaching prongs 20.

On the inner wall of the envelope beneath the point at which the fastener is to be applied is preferably situated a reinforcing patch 22 which may be of fabric or suitable paper stock, and which may be adhered to the said wall by glue 23. The said patch materially reinforces the attachment of the fastener to the envelope as the patch is preferably applied prior to the application of the fastening device, and thus the prongs of the fastener when applied will transfix the wall of the envelope, and the patch. To prevent the sharp points of the prongs from protruding into the envelope so as to possibly damage the contents thereof the points are preferably turned back as shown at 24 in Fig. 3, and partially embedded in the patch.

This fastener thus applied to an envelope provides an assembly of unusual strength and durability. The provision of at least two lobes at spaced points on the surface of the envelope having prongs therein clinched back into the body of the patch, provides an attachment which is very difficult to tear from the envelope, as pulling force exerted upon either of the tongues must work against the two points of attachment, on either side of the tongue, and the fastener cannot be lifted or removed by a rolling motion, such as is the case in similar fastenings having but one point of anchorage. It is further possible to use this fastener in the manner described, in envelopes of much lighter stock than possible with the various fasteners heretofore proposed since an extremely strong attachment may be obtained even with light paper stock.

I have described what I believe to be the best embodiments of my invention. I do not wish, however, to be confined to the embodiments shown, but what I desire to cover by Letters Patent is set forth in the appended claims.

I claim:

1. An envelope having a closure flap provided with an aperture and a rear wall formed of folded over and overlapping side panels adhered together, a reinforcing element disposed entirely inside the envelope in the form of a patch adhered to both of said side panels at their region of overlap and on the inner surface of the rear wall adjacent to and spaced from the upper edge of the rear wall, and a fastener comprising a body portion of sheet metal having aligned tongues adapted to be bent up and inserted through the aperture in said closure flap, the body portion of the fastener engaging the outer surface of said wall and being punched at spaced apart points located transversely of the line of the tongues to provide prongs, said prongs transfixing said reinforcing patch and both of said side panels and the ends of said prongs being upbent against the underside of said patch.

2. An envelope having a closure flap provided with an aperture and a rear wall, a reinforcing element disposed entirely inside the envelope in the form of a patch adhered to the inner surface of the rear wall adjacent to and spaced from the upper edge of the rear wall, and a fastener comprising a body portion of sheet metal having a tongue adapted to be bent up and inserted through the aperture in said closure flap, the body portion of the fastener engaging the outer surface of said wall and being punched at spaced apart points located transversely of the line of the tongue to provide prongs, said prongs transfixing said reinforcing patch and said rear wall and the ends of said prongs being upbent against the underside of said patch.

ABRAHAM NOVICK.